(12) United States Patent
Kim

(10) Patent No.: US 9,448,671 B2
(45) Date of Patent: Sep. 20, 2016

(54) TOUCH SCREEN PANEL AND DISPLAY DEVICE HAVING THE SAME

(71) Applicant: Samsung Display Co., Ltd., Yongin, Gyeonggi-do (KR)

(72) Inventor: Kyu-Young Kim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 20 days.

(21) Appl. No.: 14/105,529

(22) Filed: Dec. 13, 2013

(65) Prior Publication Data

US 2014/0204054 A1    Jul. 24, 2014

(30) Foreign Application Priority Data

Dec. 18, 2012    (KR) .......................... 10-2012-0148228

(51) Int. Cl.
*G06F 3/044*    (2006.01)
*G06F 3/041*    (2006.01)

(52) U.S. Cl.
CPC ............. *G06F 3/044* (2013.01); *G06F 3/0412* (2013.01); *G06F 2203/04103* (2013.01); *Y10T 29/49105* (2015.01)

(58) Field of Classification Search
CPC ........... G06F 2203/04103; G06F 2203/04113; G06F 3/041; G06F 3/0412; G06F 3/044; Y10T 29/49105
See application file for complete search history.

(56) References Cited

U.S. PATENT DOCUMENTS

| | | | |
|---|---|---|---|
| 2008/0165139 A1* | 7/2008 | Hotelling et al. | 345/173 |
| 2011/0187666 A1* | 8/2011 | Min | 345/173 |
| 2012/0026107 A1* | 2/2012 | Kim et al. | 345/173 |
| 2012/0113032 A1 | 5/2012 | Itakura et al. | |
| 2012/0211264 A1 | 8/2012 | Milne | |
| 2012/0247937 A1* | 10/2012 | Saito et al. | 200/512 |
| 2013/0106727 A1* | 5/2013 | Juan et al. | 345/173 |

FOREIGN PATENT DOCUMENTS

| | | |
|---|---|---|
| KR | 10-1125701 B1 | 3/2012 |
| KR | 10-2012-0048854 | 5/2012 |
| KR | 10-2012-0098736 | 9/2012 |

\* cited by examiner

*Primary Examiner* — Priyank Shah
(74) *Attorney, Agent, or Firm* — Knobbe Martens Olson & Bear LLP

(57) ABSTRACT

A touch screen panel includes: a substrate; an opaque peripheral pattern formed on one surface of a non active area of the substrate; an insulating member disposed on an active area of inside of the peripheral pattern so as to be positioned on a same layer as the peripheral pattern; conductive sensing cells formed on the insulating member; and peripheral wirings connected to the conductive sensing cells and formed on the peripheral pattern.

6 Claims, 2 Drawing Sheets

TOUCH SCREEN PANEL AND DISPLAY DEVICE HAVING THE SAME

CROSS-REFERENCE TO RELATED APPLICATIONS

This application claims priority to and the benefit of Korean Patent Application No. 10-2012-0148228, filed on Dec. 18, 2012, in the Korean Intellectual Property Office, the entire content of which is incorporated herein by reference.

BACKGROUND

1. Field

The present disclosure relates to a touch screen panel (TSP) being implemented as a windows-integrated type, and a display device having the same.

2. Description of the Related Technology

A touch screen panel is an input device capable of inputting a user's instructions by allowing selection of instruction contents displayed on a screen, such as a display device, or the like, with a human hand or an object.

To this end, the touch screen panel is provided on a front face of the display device to convert a contact position directly contacted by the human hand or the object into an electric signal. Therefore, the instruction contents selected at the contact position are recognized as an input signal.

Since the touch screen panel as described above may substitute a separate input device such as a keyboard or a mouse connected to the display device and operated, application fields thereof have been gradually extended.

The touch screen panel as described above recognizes a touch event generated in a screen area as an input signal by forming a conductive sensing cell at a screen area displaying an image. That is, in a case in which a display device includes a touch screen panel, the screen area is set to be a display area displaying an image and an active area capable of inputting the touch input.

Peripheral wirings, such as signal lines, power lines and the like, are connected to the pixels and sensing cells. These peripheral wirings are disposed in an edge of the screen area, which is set to a non active area and a black matrix area for preventing the wirings from being visible.

To this end, the black matrix is formed on a window substrate disposed on the uppermost portion of the display device, corresponding to the non active area.

The touch screen panel, or the like, is disposed at a lower portion of the window substrate having the black matrix and may be attached to one surface of the window substrate having the black matrix by an optical cleared adhesive (OCA).

However, during the attaching process, a problem, such as a bubble generated at a boundary between the active area and the non active area, or the like, due to a step difference caused by the black matrix, may occur.

Further, in a case in which the window substrate and a substrate for touch screen panel are separately provided, the display device having the touch screen panel is configured with a substrate for touch screen panel having the conductive sensing cell for sensing touch and the window substrate disposed on the upper portion thereof, as well as a display panel for displaying the image. Therefore, a structure of the display device having the touch screen panel is relatively complex and a disadvantage of an increased thickness thereof exists.

Therefore, there is need to find a method in order to simplify the structure of the touch screen panel and the display device having the same and prevent problems such as bubbles from being generated due to a step difference caused by the black matrix.

SUMMARY OF CERTAIN INVENTIVE ASPECTS

An object of the present invention provides a touch screen panel capable of reducing a step difference caused by a black matrix while being integrated with a window, and display device having the same.

The touch screen panel according to the present invention includes: a substrate; an opaque peripheral pattern formed on one surface of a non active area of the substrate; an insulating member disposed on an inside active area of the peripheral pattern so as to be positioned on a same layer as the peripheral pattern; conductive sensing cells formed on the insulating member; and peripheral wirings connected to the conductive sensing cells and formed on the peripheral pattern.

Here, the opaque peripheral pattern is implement as a black matrix.

The opaque peripheral pattern may have a multilayered structure including a decorative layer disposed on a side of the substrate and a black matrix disposed between the peripheral wirings.

The decorative layer may be implemented as a white color layer formed to have a thickness larger than that of the black matrix.

The insulating member is implemented as one of a transparent film or an organic insulating film.

The opaque peripheral pattern and the insulating member may be formed to have a same or similar height as each other.

Another aspect of the present invention, the touch screen panel may include a display panel displaying an image and a touch screen panel positioned on the display panel to receive a touch input, wherein the touch panel includes: a substrate; an opaque peripheral pattern formed on one surface of a non active area of the substrate; an insulating member disposed on an active area of an inner portion of the peripheral pattern so as to be positioned on a same layer as the peripheral pattern; conductive sensing cells formed on the insulating member; and peripheral wirings connected to the conductive sensing cells and formed on the peripheral pattern.

Here, the opaque peripheral pattern may include at least a black matrix.

The opaque peripheral pattern may further include a decorative layer disposed between the substrate and the black matrix.

The insulating member may be implemented as one of a transparent film or an organic insulating film.

A method of forming the touch screen panel may include: forming the opaque peripheral pattern on the non-active area of the one surface of the substrate; disposing the insulating member on the active area of inside of the peripheral pattern, such that the insulating member is positioned on the same layer as the peripheral pattern; forming the conductive sensing cells on the insulating member; and connecting forming the peripheral wirings on the peripheral pattern such that the peripheral wirings are connected to the conductive sensing cells.

A method of forming the display device may include: forming the opaque peripheral pattern on the non-active area of the one surface of the substrate; disposing the insulating member on the active area of inside of the peripheral pattern, such that the insulating member is positioned on the same layer as the peripheral pattern; forming the conductive sensing cells on the insulating member; connecting forming the peripheral wirings on the peripheral pattern such that the peripheral wirings are connected to the conductive sensing cells to form the touch screen panel; and positioning the touch screen panel on the display panel to receive the touch input.

BRIEF DESCRIPTION OF THE DRAWINGS

The accompanying drawings, together with the specification, illustrate certain embodiments of the present invention, and, together with the description, serve to explain the principles of the present invention.

DETAILED DESCRIPTION OF CERTAIN INVENTIVE EMBODIMENTS

Figure 1:
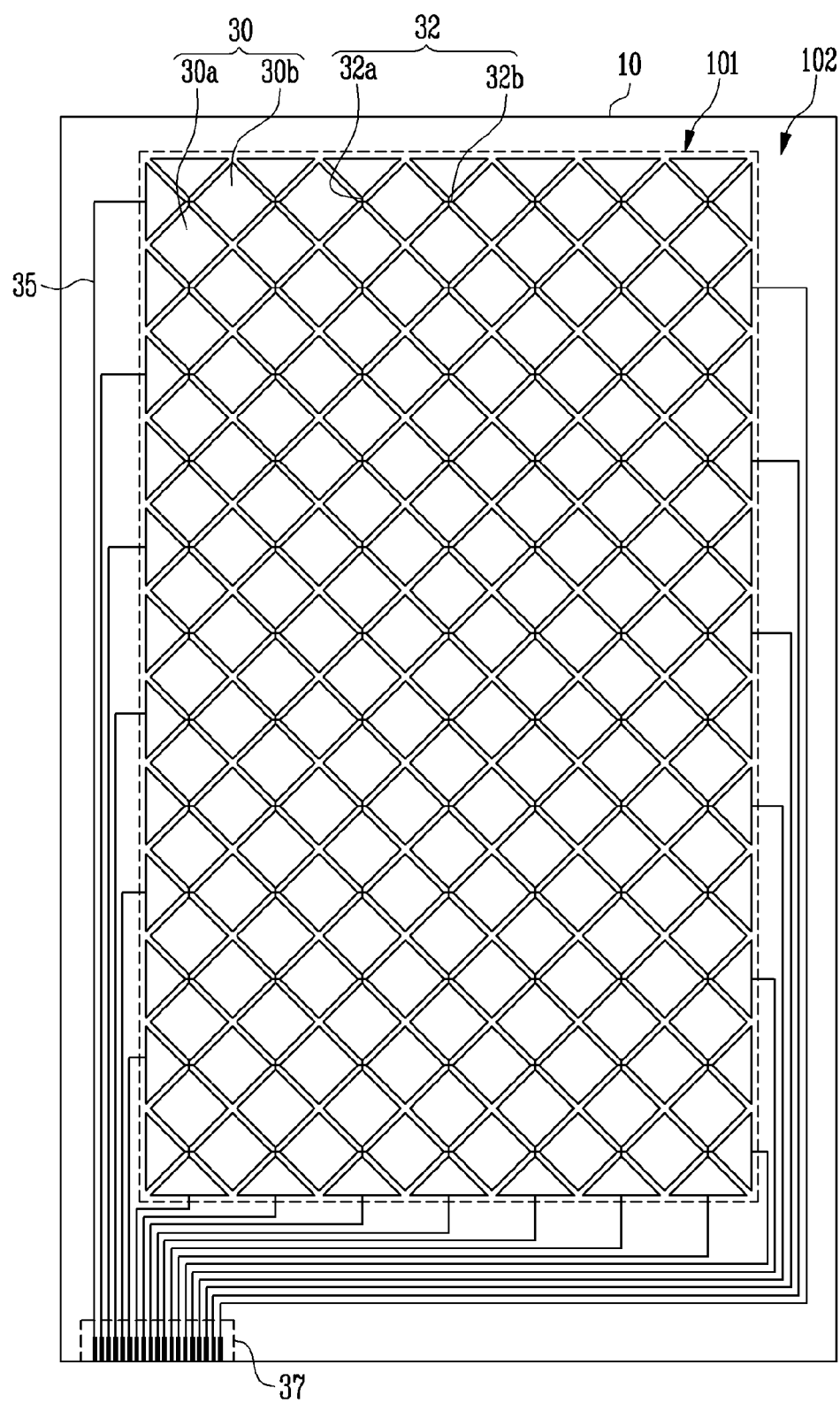
FIG. 1 is a plan view showing an example of a touch screen panel.

In the following detailed description, only certain embodiments of the present invention have been shown and described, simply by way of illustration. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals generally refer to like elements.

Hereinafter, embodiments of the present invention will be described in detail with reference to the accompanying drawings.

FIG. 1 is a plan view showing an example of a touch screen panel.

Referring to FIG. 1, a touch screen panel includes: a substrate 10, a plurality of conductive sensing cells 30 formed on the substrate 10, connecting patterns 32 for connecting the sensing cells 30 in a first direction or a second direction, and peripheral wirings 35 for connecting the sensing cells 30 to a driving circuit of the peripheral wirings through a pad unit 37.

The substrate 10, which is a base component of the touch screen panel, may be formed using a transparent substrate material, such as a glass, polyethylene telephtalate (PET), acryl, or the like. The term "transparency" includes transparency having a high optical transmittance.

The sensing cells 30, which are formed on one surface of the active area 101 of the substrate 10, may be formed of a transparent electrode formed of indium tin oxide (ITO), or the like, or a metal electrode patterned to be secure a predetermined transmittance or higher. The sensing cells 30 as described above, in order to detect a position according to a touch input, include first sensing cells 30a connected in a first direction and second sensing cells 30b connected in a second direction.

The first sensing cells 30a are connected in the first direction, for example, in a column direction, by the first connecting patterns 32a, and are connected to the peripheral wirings 35 in a column line unit, respectively.

The second sensing cells 30b are disposed between the first sensing cells 30a so as to be insulated from the first sensing cells 30a, and are connected in the second direction different from the first direction, for example, in the row direction, by the second connecting patterns 32b and connected to the peripheral wirings 35 in a row line unit, respectively.

The first and second sensing cells 30a and 30b may be positioned on the same layer, and may be respectively connected in the first and second directions by first and second connection patterns 32a and 32b insulated from each other with an insulating layer interposed therebetween, or may be positioned on a different layer with the insulating layer interposed therebetween.

The peripheral wirings 35, which are formed on non active area 102 of one surface of the substrate 10, connect the sensing cells 30 to an external drive circuit (not shown) such as, for example, a position detecting circuit, through the pad unit 37.

Since the peripheral wirings 35 may be disposed in a non-active area 102 positioned at the periphery of the touch screen panel but not the active area 101 displaying an image, the peripheral wirings 35 may be formed of a low-resistance material, such as, molybdenum (Mo), silver (Ag), titanium (Ti), copper (Cu), aluminum (Al), molybdenum/aluminum/molybdenum (Mo/Al/Mo), and the like. In addition, the limitation on thickness, width, or the like, of the peripheral wirings 35 is relatively low.

The touch screen panel according to an embodiment of the present invention as described above is a capacitive type touch panel. When a contact object, such as a user's hand or stylus pen, comes into contact with the touch screen panel, a change of capacitance according to a contact position may be transferred to a side of driving circuit (not shown) from the sensing cells 30 via the peripheral wirings 35 and the pad unit 37.

Then, the change in the capacitance is converted into an electrical signal by X and Y input processing circuits (now shown), or the like, such that the contact position is recognized.

Figure 2:
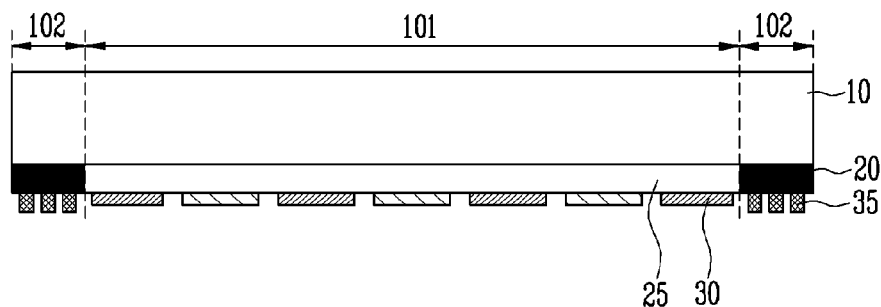
FIG. 2 is a cross-sectional view showing a window-integrated touch screen panel according to an embodiment of the present invention.
Figure 3:
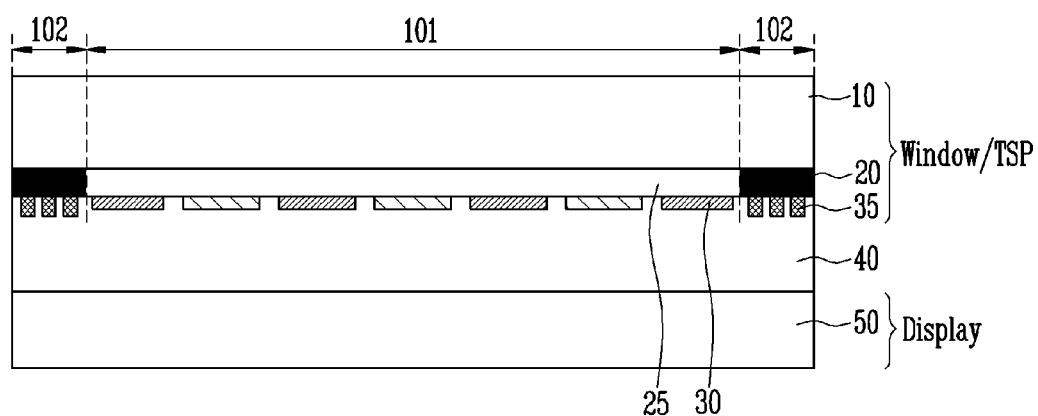
FIG. 3 is a cross-sectional view showing a display device having the window-integrated touch screen panel shown in FIG. 2.

FIG. 2 is a cross-sectional view showing a unified window touch screen panel according to an embodiment of the present invention, and FIG. 3 is a cross-sectional view showing a display device having the unified window touch screen panel shown in FIG. 2. Here, although the embodiment is described as a capacitive type touch screen panel, any other type of touch screen panel is also possible.

In the description of FIGS. 2 and 3, for convenience, components that are the same as those of FIG. 1 will be denoted by the same reference numerals and detailed description thereof will be omitted.

First, referring to FIG. 2, the touch screen panel according to an embodiment includes: the substrate 10, an opaque peripheral pattern 20 formed at one surface of the non active area 102, an insulating member 25 disposed at an inner portion active area 101 of the peripheral pattern to be positioned at a same layer of the peripheral pattern 20, conductive sensing cells 30 formed on the insulating member 25, and peripheral wirings 35 connected to the sensing cells 30 and formed on the peripheral pattern 20.

The substrate 10, which serves as a window and may be a base component of the touch screen panel, may be formed of a transparent material such as a glass or a transparent film.

As described above, in the case where the substrate 10 is used as both of a window and a substrate for the touch screen panel, as well as the opaque peripheral pattern 20 such as a black matrix, the conductive sensing cells 30 for sensing touch and/or the peripheral wirings 35 are formed one surface of the substrate 10, for example, a rear surface toward a display panel.

The peripheral pattern 20, which is formed on the non active area 102 of one surface of the substrate 10, is implemented opaquely so as to prevent the peripheral wirings 35 on the lower portion from being visible. For example, the peripheral pattern 20 may be implemented as a black matrix.

The insulating member 25 is disposed on the active area 101 of inside of the peripheral pattern 20, and implemented as a transparent film, an organic insulating film, or the like. The insulating member 25 is formed to have a height substantially the same as that of the peripheral pattern 20 so that a step difference is not generated at a boundary between the active area 101 and the non active area 102. As used herein a height "substantially the same" as that of the peripheral pattern may vary within a predetermined error range, such as within 1%, 2%, 3%, 4%, 5%, 6%, 7%, 8%, 9%, 10%, 11%, 12% 13%, 14%, 15%, 16%, 17%, 18%, 19%, 20%, 21%, 22%, 23%, 24%, 25%, 30%, 35%, 40%, 45%, 50% or even greater, depending on the particular process conditions employed.

The sensing cells 30 are formed on the insulating member 25, and the peripheral wirings 35 connected to the sensing cells 30 are formed on the peripheral pattern 20. The peripheral wirings 35 may be connected to the sensing cells 30 by various methods such as through a contact hole, a direct contact, or the like.

As described above, during a manufacturing method of the touch screen panel shown in FIG. 2 the substrate 10 is provided and the peripheral pattern 20 and the insulating member 25 are formed on one surface of the substrate 10. The peripheral pattern 20 and the insulating member 25 are formed at the non active area 102 and the active area 101 of the substrate, respectively, and an order of manufacturing thereof may be determined by materials, manufacturing method, and the like, of the peripheral pattern 20 and/or the insulating member 25.

For example, in a case where the peripheral pattern 20 is implemented as a black matrix formed by a screen printing method and the insulating member 20 is implemented as a transparent film attached on the substrate 10, after the insulating member 25 is formed on one surface of the active area 101 of the substrate 10, the peripheral pattern 20 may be implemented by forming the black matrix formed by a screen printing method on the same surface of the non active area 102 of the substrate 10.

Here, the black matrix may be formed to have a thickness similar to the transparent film, to this end, the black matrix may be formed by printing at two degrees or higher. However, in a case where the transparent film has a thick thickness, the black matrix should be implemented by printing at ten degrees or higher. Therefore, the thickness of the transparent film may be about 50 μm. Although the conductive sensing cells 30 are formed on a thin transparent film, the transparent film is attached to the substrate 10. Therefore, the substrate 10 serves as a carrier so that the sensing cells 30 are relatively easily formed. In addition, although the thickness of the black matrix is smaller than that of the transparent film, in a manufacturing process, or the like, described below, a thickness difference between the black matrix and the transparent film caused by the peripheral wirings 35 may be compensated.

In a case where the peripheral pattern 20 is implemented as a black matrix formed by a screen printing method and the insulating member 25 is implemented as a transparent film attached on the substrate 10, an attaching process of the transparent film is not necessarily performed in advance than a forming of the black matrix, and their manufacturing order may be switched.

In another example of material of the insulating member 25, there is an organic insulating film. However, in a case where the insulating member 25 is implemented as an organic insulating film, the black matrix is first formed as the peripheral pattern 20 and then the insulating member 25 is formed by coating an inner portion of the peripheral pattern 20 with the organic insulating film, thereby making it possible to easily balance heights of the black matrix and the organic insulating film. The organic insulating film may be formed by using a mega-type UV curable organic insulating material, in this case, when an exposing is performed at a side of the substrate 10, an organic insulating material of the non active area 102 where light is not supplied by the peripheral pattern 20 is not cured, thereby making it possible to easily form the organic insulating film only on the active area 101.

When the peripheral pattern 20 and the insulating member 25 are formed, the touch screen panel is implemented by forming the peripheral patterns 35 and the conductive sensing cells 30 on the peripheral pattern 20 and the insulating member 25, respectively.

In the touch screen panel as described above, an opaque peripheral pattern 20 such as the black matrix, is formed on the non active area 102 of one surface of the substrate 10. As noted above, the insulating member 25 is formed to have a height substantially the same as that of the peripheral pattern 20. As such, the insulating member 25 is formed at an inner portion of the active area 101 so as to be positioned at the same layer as the peripheral pattern 20. The conductive sensing cells 30 for sensing a touch are formed on the insulating member 25, and the peripheral wirings 35 are formed on the peripheral pattern 20. Therefore, while implementing the window-integrated touch screen panel having a simplified structure and a reduced thickness thereof, the generation of bubbles during the manufacturing process may be prevented by reducing the step difference caused by the opaque peripheral pattern 20.

Further, in a case where the insulating member 25 is implemented as a transparent film, the transparent film is attached to the substrate 10 by an adhesive component instead of a transparent adhesive having a thick thickness such as OCA, thereby making it possible to reduce the thickness thereof. In addition, the substrate 10 may be used as a carrier substrate used for forming a pattern on a thin film, thereby making it possible to reduce the thickness of the transparent film.

A display panel 50 displaying the image is attached to a lower portion of the window-integrated touch screen panel as shown in FIG. 3, and the window-integrated touch screen panel is coupled to an upper portion of the display panel 50 by a transparent adhesive 40 such as OCA, to thereby receive the touch input. One surface of the substrate 10 having the peripheral pattern 20, the insulating member 25, the sensing cells 30, and the peripheral wirings 35 formed thereon is set to a surface toward the display panel 50, for example, a rear surface.

Figure 4:
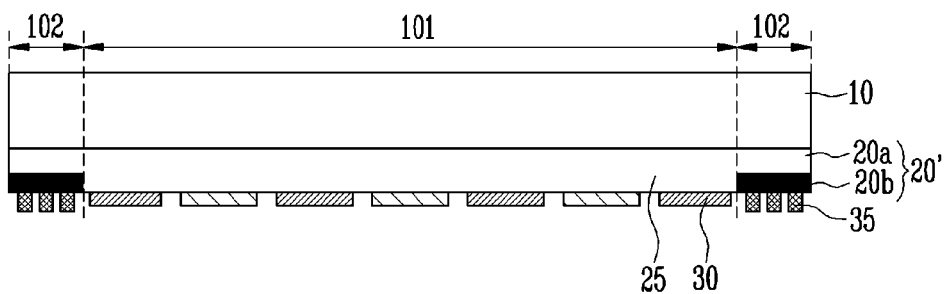
FIG. 4 is a cross-sectional view showing a window-integrated touch screen panel according to another embodiment of the present invention.

FIG. 4 is a cross-sectional view showing a window-integrated touch screen panel according to another embodiment of the present invention. FIG. 4 shows an example where the peripheral pattern is formed in a multilayered structure composed of at least two layers having different colors. For convenience, parts in FIG. 4, which are similar to or the same as those in FIG. 2, will be designated by the same reference numerals, and detail descriptions thereof will be omitted.

Referring to FIG. 4, an opaque peripheral pattern 20' is formed of a multilayered structure having a decorative layer 20a disposed on a side of the substrate 10 and a black matrix 20b disposed between the decorative layer 20a and the peripheral wirings 35.

When the opaque peripheral pattern 20' is formed as a multilayered structure, a window-integrated touch screen panel having a color edge is implemented while the 20a is implemented by various colors, thereby making it possible to improve a design freedom and provide an aesthetic effect.

For example, the decorative layer 20a may be formed as a white color layer. A vivid white color may be displayed by forming the decorative layer 20a to be thicker than the black matrix 20b. In addition, since the black matrix 20b is positioned below the decorative layer 20a, the peripheral wirings 35 and the like can be effectively prevented from being visualized.

As set forth above, an opaque peripheral pattern such as a black matrix, is formed on the non active area of one surface of the substrate, the insulating member is disposed on an active area of an inside of the peripheral pattern so as to be positioned on a same layer as the peripheral pattern. Conductive sensing cells for sensing touch are formed to be positioned on the insulating member; and peripheral wirings connected to the conductive sensing cells are formed to be positioned on the peripheral pattern. Therefore, a window-integrated touch screen panel having a simplified structure and a reduced thickness can be realized, and bubble generation can be prevented during the manufacturing process by reducing the step difference due to the opaque peripheral pattern 20.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   a substrate;
   an opaque peripheral pattern formed on a non-active area of one surface of the substrate;
   an insulating member disposed on an active area of inside of the opaque peripheral pattern so as to be positioned on a same layer as the opaque peripheral pattern;
   conductive sensing cells formed on the insulating member; and
   peripheral wirings connected to the conductive sensing cells and formed on the opaque peripheral pattern,
   wherein the opaque peripheral pattern includes a multi-layered structure having a white color layer disposed on a side of the substrate and a black matrix disposed between the white color layer and the peripheral wirings, wherein the white color layer is formed to have a thickness larger than that of the black matrix,
   wherein the white color layer and the black matrix together are formed to have a same height as the insulating member, and
   wherein the white color layer and the black matrix are formed to have a same width or similar width as each other.

2. The touch screen panel according to the claim 1,
   wherein the insulating member is implemented as one of a transparent film or an organic insulating film.

3. A display device comprising:
   a display panel displaying an image; and
   a touch screen panel positioned on the display panel to receive a touch input, wherein the touch panel includes:
   a substrate;
   an opaque peripheral pattern formed on a non active area of one surface toward the display panel of the substrate;
   an insulating member disposed on an active area of inside of the opaque peripheral pattern so as to be positioned on a same layer as the opaque peripheral pattern;
   conductive sensing cells formed on the insulating member; and
   peripheral wirings connected to the conductive sensing cells and formed on the opaque peripheral pattern,
   wherein the opaque peripheral pattern includes a multi-layered structure having a white color layer disposed on a side of the substrate and a black matrix disposed between the white color layer and the peripheral wirings, wherein the white color layer is formed to have a thickness larger than that of the black matrix,
   wherein the white color layer and the black matrix together are formed to have a same height as the insulating member, and
   wherein the white color layer and the black matrix are formed to have a same width or similar width as each other.

4. The display device according to the claim 3,
   wherein the insulating member is implemented as one of a transparent film or an organic insulating film.

5. A method of forming a touch screen panel comprising:
   forming an opaque peripheral pattern on a non-active area of one surface of a substrate;
   disposing an insulating member on an active area inside of the opaque peripheral pattern, such that the insulating member is positioned on the same layer as the opaque peripheral pattern;
   forming conductive sensing cells on the insulating member; and
   forming peripheral wirings on the opaque peripheral pattern such that the peripheral wirings are connected to the conductive sensing cells,
   wherein the opaque peripheral pattern includes a multi-layered structure having a white color layer disposed on a side of the substrate and a black matrix disposed between the white color layer and the peripheral wirings, wherein the white color layer is formed to have a thickness larger than that of the black matrix,
   wherein the white color layer and the black matrix together are formed to have a same height as the insulating member, and
   wherein the white color layer and the black matrix are formed to have a same width or similar width as each other.

6. A method of forming a display device comprising:
   forming an opaque peripheral pattern on a non-active area of one surface of a substrate;

disposing an insulating member on an active area inside of the opaque peripheral pattern, such that the insulating member is positioned on the same layer as the opaque peripheral pattern;

forming conductive sensing cells on the insulating member;

forming the peripheral wirings on the opaque peripheral pattern such that the peripheral wirings are connected to the conductive sensing cells to form a touch screen panel; and positioning the touch screen panel on a display panel to receive a touch input, wherein the opaque peripheral pattern includes a multi-layered structure having a white color layer disposed on a side of the substrate and a black matrix disposed between the white color layer and the peripheral wirings, wherein the white color layer is formed to have a thickness larger than that of the black matrix, wherein the white color layer and the black matrix together are formed to have a same height as the insulating member, and wherein the white color layer and the black matrix are formed to have a same width or a similar width as each other.

* * * * *